April 10, 1962  R. H. PARK  3,028,622
METHOD AND APPARATUS FOR IMPROVING POLYETHYLENE SURFACES
Filed July 21, 1953  2 Sheets-Sheet 1
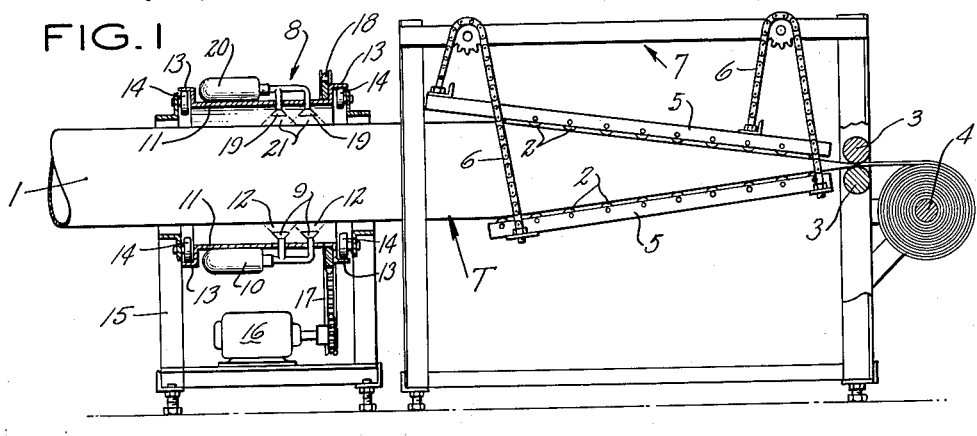
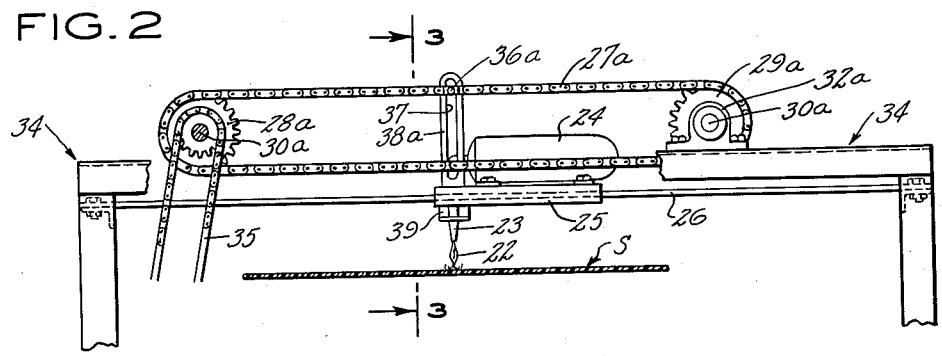
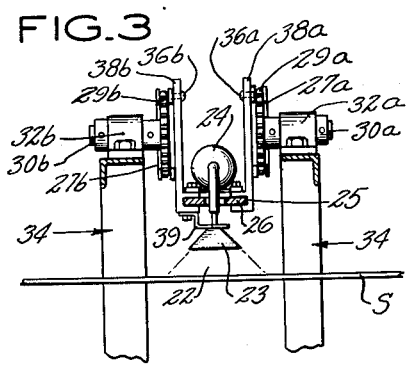 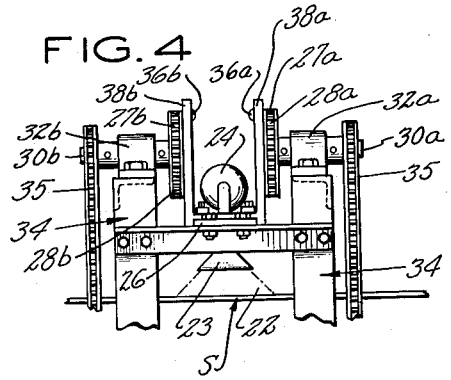
INVENTOR
ROBERT H. PARK
BY Bates & Willard
ATTORNEYS April 10, 1962  R. H. PARK  3,028,622
METHOD AND APPARATUS FOR IMPROVING POLYETHYLENE SURFACES
Filed July 21, 1953  2 Sheets-Sheet 2

INVENTOR
ROBERT H. PARK
BY Bates & Willard
ATTORNEYS

United States Patent Office 3,028,622
Patented Apr. 10, 1962

3,028,622
METHOD AND APPARATUS FOR IMPROVING POLYETHYLENE SURFACES
Robert H. Park, Dennis, Mass., assignor to Plax Corporation, West Hartford, Conn., a corporation of Delaware
Filed July 21, 1953, Ser. No. 369,467
3 Claims. (Cl. 18—1)

This invention relates to the modification of polyethylene articles, and more particularly to the oxidation of the surfaces of such articles, so that inks, cements, adhesives and the like adhere more readily and more firmly than to untreated surfaces.

Difficulty has been experienced in cementing polyethylene products and in printing legends thereon, the normally hydrophobic surface of polyethylene being unreceptive to most glues, adhesives and printing inks and dyes.

Heretofore, polyethylene surfaces have been made hydrophilic and adaptable to cementing and printing by oxidation. The surface may be prepared by passing it through a bath of an oxidizing solution, such as sulphuric acid-dichromate, and then washing in water and drying.

Exposures to an oxidizing flame and to high temperature oxidizing gases also have proved successful. However, in the case of polyethylene sheet, tubing and similar thin film products, the problem of obtaining a flame treatment sufficiently intense to modify the surface is complicated by the difficulty of preventing destruction of the film.

Proposed solutions to the problem have been to support the sheet on rollers which are internally cooled, or on porous rolls, through which a cooling liquid is supplied into cooling contact with the film, the opposite surface of which is concurrently flamed. In the case of extruded film, the sheet may be fed directly from the die to the rollers and laid down uniformly thereon for flaming while still hot.

Generally, short-term heating at the high temperature presented by direct contact with or close proximity to a flame is preferable to heating for a longer time at lower temperatures.

Heretofore, it has been customary to move a polyethylene surface which is to be treated past or through hot air or flames from stationary burners or jets. When integrated with production of film or the like, the rate of production constituted a limitation on the speed with which the film moved past the stationary heater. Moreover, even though treatment be independent of extrusion, high speed film travel requires expensive handling machinery to maintain proper spacing from the burner and to prevent stretching and tearing. Consequently, it has been difficult to obtain the desirably short exposure to intense oxidizing heat.

Therefore, it is an object of the present invention to provide improved methods and means for treating polyethylene film for printability with an oxidizing flame or high temperature gas. Generally this is accomplished by movement of the heater rather than, or in addition to, movement of the film and preferably to effect a more rapid relative movement between the heater and the film than is practicable by movement of the film relative to the continuously applied heat from a stationary flame or other source of intense oxidizing heat.

In accordance with the invention, a series of burners or jets are arranged and adapted to be moved, or otherwise made intermittently effective, so the plastic film, whether stationary or moving, has an extremely short exposure to the intense oxidizing heat.

Having in view the above and other objects which will be more apparent hereinafter, the invention consists in the novel methods, construction, arrangement and combination of elements and parts set forth in the appended claims, certain illustrative embodiments of the invention being described in the following specification with reference to the accompanying drawings, in which:

FIGURE 1 is a side elevation view, partly schematic, of apparatus forming one illustrative embodiment of the invention for treating tubing;

FIG. 2 is an elevation view of another illustrative embodiment of the invention showing a transverse cross-section of plastic sheet in the process of being treated;

FIG. 3 is a cross-sectional view taken on line 3—3 of FIG. 2;

FIG. 4 is a side view of the apparatus shown in FIG. 2 looking in the same direction as FIG. 3;

Figure 5:
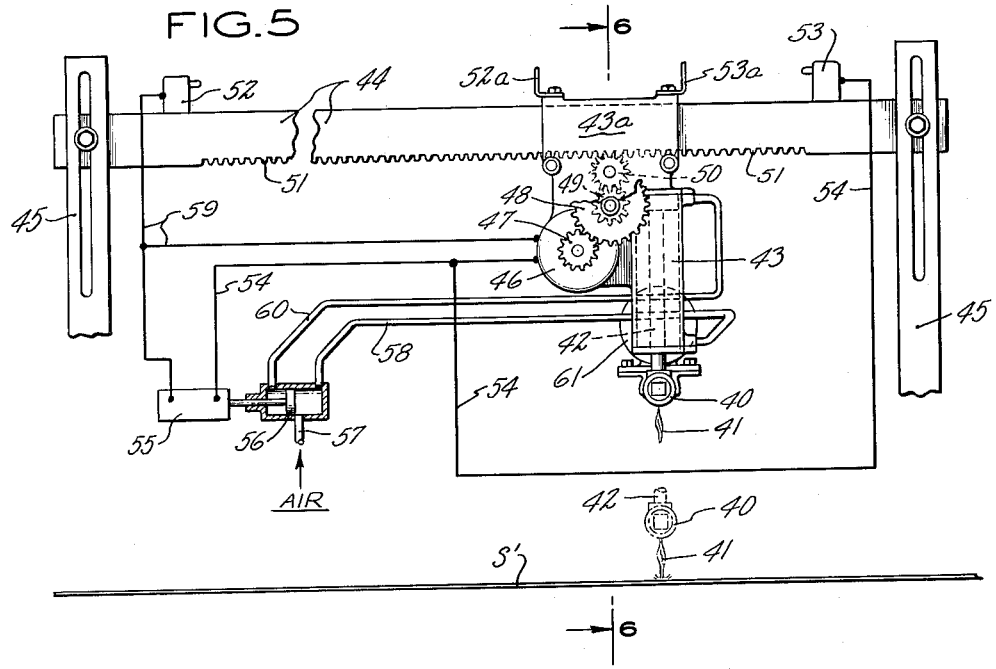
FIG. 5 is a side elevation view, partly schematic, of a further illustrative embodiment of apparatus for treating sheet in accordance with the present invention.

Referring to FIG. 1 of the drawings, there is there shown an inflated portion 1 of polyethylene tubing T which is fed from a suitable source, such as an extrusion die or a supply roll (not shown), to a series of collapsing rollers 2, and thereafter through the nip of a pair of pulling rolls 3 to a roll 4 on which the collapsed tubing is progressively wound in well known manner.

As shown in FIG. 1, the collapsing rollers 2 may be mounted on frames 5, the positions of which may be adjusted by chains 6 relative to a supporting structure, generally designated 7, so as to progressively collapse the tubing T in an optimum manner. The structure thus far described is merely illustrative of one form of apparatus with which inflated polyethylene tubing is presently handled and is described more particularly in U.S. Patent No 2,259,386, issued July 3, 1951, to James Bailey.

In accordance with the present invention, equipment generally designated 8 is provided for effecting very short exposure of the inflated tubing 1 to the intense oxidizing heat of jets or burners 9.

More particularly, the burners 9 may be supplied with a combustible mixture from a tank 10 or other suitable reservoir. In the embodiment shown in FIG. 1, the tank 10 and burners 9 are mounted on a drum 11 for rotation about the inflated tubing 1 while retained at a substantially constant distance therefrom. The drum 11 preferably is concentrically disposed about the tubing 1 with the tank 10 mounted outside and shielded by the drum from flame 12 of the burners 9 which are located therein. The illustrated burners 9 are of the fishtail type disposed in alignment so as to direct a substantially straight thin sheet of flame radially at the tubing parallel with its axis.

The drum 11 is journaled for rotation concentrically about the tubing 1 so that the exposure of each portion of the tubing to the flame 12 is very brief and substantially shorter than would be practical if the tubing 1 were moved past a stationary flame.

In order to provide for such rotation in the embodiment shown in FIG. 1, the drum 11 includes flanged lips 13 which ride on bearing rollers 14 rotatably secured to a frame 15 and rotation is effected by a motor 16 through a chain drive 17 which engages sprocket 18 secured to the drum. While two such burners 9 are shown, one or more may be used as may be found desirable.

Moreover, additional burners 19 and tanks 20 may be disposed at intervals about the periphery of the drum. While these burners 19 may be the source of additional oxidizing flames, in the illustrated embodiment they provide for the discharge of cooling jets 21 on the tubing 1 immediately following its exposure to the oxidizing heat of the flames 12. While shown diammetrically opposite the burner 9, the jets 19, if desirable, may be located adjacent to, so as to more closely follow the burners 9 and effect more immediate cooling of the tubing portions subjected to the flames 12.

It will be apparent that successive portions of the tubing are treated in a generally helical path by the flames 12 as the tubing 1 is drawn axially along by the pulling rolls 3. Should the travel of the tubing be interrupted for any reason, continued movement of the burners 9 protects the tubing from being overheated and burned. Moreover, this protection is effected without interrupting or discontinuing the flames 12 or other oxidizing heat.

The rotation of the burners 9 about the tubing 1 may be at any desired speed to effect a desired oxidizing exposure time without encountering the difficulties attendant on attempts to achieve similarly short exposures by movement of the tubing only relative to a stationary source of continuous oxidizing heat.

The embodiment of the invention, shown in FIGS. 2-4, exposes polyethylene sheet S to flame 22 from a burner 23 or other source of oxidizing heat which is secured with a tank or similar reservoir of combustibles 24 to a carrage 25 mounted on a rail 26 so as to provide for horizontal movement of the burner 23 transversely of the plastic sheet S. As shown in FIGS. 2-4, this transverse movement is effected by chains 27a, 27b which extend on opposite sides of the carriage 25 transversely of the sheet S over spaced sprockets 28a, 29a and 28b, 29b, respectively, which are secured to shafts 30a and 31b suitably journaled, as at 32a and 32b on frame 34, and driven as by a chain drive 35. Secured to links of each chain 27a, 27b are aligned horizontal pins or studs 36a, 36b, respectively, which extend inwardly into vertically slotted guideways 37 of members 38a, 38b which extend upwardly from the carriage 25. It will be apparent that as the chains 27a, 27b make a revolution, the pins 36a, 36b move the carriage back and forth between extreme limits of travel transversely of the sheet S and thereby subject portions of the sheet from one side to the other successively to flame 22 from the burner 23.

Preferably, the longitudinal travel of the sheet S is sufficiently slow relative to the transverse movement of the burner 23 so that all portions of the sheet are exposed to contact and oxidizing effect of the flame 22.

As in the embodiment shown in FIG. 1, the embodiment of FIGS. 2-4 may include a shield 39 intermediate the flame 22 and the tank 24 so as to lessen the hazard of the proximity of the two.

Figure 6:
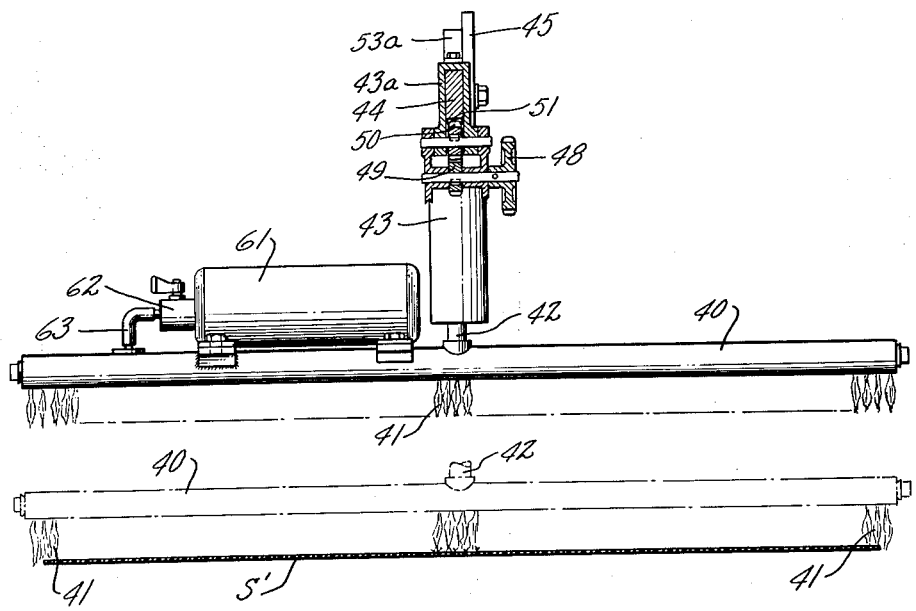
FIG. 6 is a cross-section view taken on line 6—6 of FIG. 5.

Referring more particularly to FIGS. 5 and 6, there is there shown a third embodiment of the invention in which a burner 40 extends transversely of plastic sheet S' and directs a flame 41 against the sheet through its width.

The burner 40 is mounted for both vertical and horizontal movements so that the flame 41 may be moved to contact successive transverse portions of the sheet S' and thereafter raised out of contact with the sheet, moved in the reverse horizontal direction, and lowered into contact with the sheet for a repetition of the movement.

More particularly in the illustrated embodiment, the burner 40 is secured intermediate its ends to a vertically disposed piston rod 42 which extends downwardly from an air motor 43 mounted for movement longitudinally on the sheet S' by a carriage 43a slidably supported on a horizontal guide rail 44 which is adjustably secured at its ends to the slotted frame members 45 so that the flame 41 may be properly positioned relative to the sheet S'.

In order to move the burner 40 longitudinally of the sheet, there is mounted on the air motor 43 an electric motor 46 which drives a series of gears 47, 48, 49 and 50, the latter of which engages a rack 51 formed on the rail 44 to move the carriage 43a longitudinally on the rail 44 and thereby move the burner 40 longitudinally relative to the sheet S'.

Limit switches 52 and 53 are provided to reverse the motor 46 when the carriage 43a completes its travel in each direction on the rail 44. Thus, when lugs 53a on the carriage 43a engages limit switch 53, a signal through line 54 reverses the motor 46 thereby initiating travel of the carriage 43a to the left (FIG. 5). Concurrently, the signal in line 54 causes solenoid 55 to move valve 56 to the left (FIG. 5) and connect air supply line 57 with line 58 to the air motor 43 thereby causing the motor to raise the burner 40 to the elevation shown in full line in FIGS. 5 and 6.

Preferably, conventional time delay means (not shown) assure that the raising of the burner 40 by the motor 43 is initiated somewhat prior to the completion of travel of the carriage 43a so that the sheet S' is sufficiently removed from the flame 41 to prevent its being burned or distorted.

Actuation of switch 53 also deenergizes a line 59 to the motor 46 and solenoid 55 prior to energizing the line 54. However, movement of the carriage 43a to the left (FIG. 5) causes lug 52a to engage and operate microswitch 52 thereby deenergizing line 54 and reversing the motor 46. Concurrently, the line 59 energizes the solenoid 55 so as to move the valve 56 and connect air line 57 through line 60 which operates the air motor 43 and thereby lowers the burner 40 to the position shown in phantom in FIGS. 5 and 6 where the oxidizing flame 41 is directed against the film S' during the travel of the carriage 43a to the limit switch 53.

While the sheet S' may be stationary during contact by the flame 41, it is contemplated that the sheet normally will be moving preferably continuously and to the left as viewed in FIG. 5. If the sheet S' travels at the same or a slower speed than that of the carriage 43a, the movement of the carriage to the left with the burner 40 elevated will keep pace or exceed the speed of the sheet S' in the same direction so that the sheet is engaged by the flame 41 throughout its length during the countermovement of the carriage 43a to the right. It will be apparent that the exposure of the sheet S' to the flame 41 may be overlapped in any desired pattern. Adjustment of the switch actuators 52a and 53a on the carriage 43a provide for slight adjustment of the length of travel of the carriage and further adjustment may be made by repositioning the switches 52 and 53 on the rail 44.

As shown in the drawings, the burner 40 is supplied with combustibles from a tank 61 through a valve 62 and connection 63.

When a gas burner is used, the heat developed by the flame may be such that the front surface of the polyethylene body is elevated to a temperature of from 600 to 700° F. or more. The distance between the tips of the burner and the front surface of the body may be varied, and the length of the flame jets adjusted, so that in the nearmost position the oxidizing portion of the flame 41 either impinges directly upon the surface or is spaced for a predetermined small distance therefrom, for instance, up to one inch.

The linear transporting speed of the body may be from 60 to 100 feet per minute and the burner may move with a speed so that the nozzle has a linear differential speed as against the body of from 400 to 500 feet per minute. This means that, when the flame travels with the sheet or other body, the burner movement must be faster than when the flame travels opposite to the body.

The instant invention permits the use of very hot flames which heretofore could not be used in connection with polyethylene bodies. Such very hot flames may be provided by means of oxygen torches, oxygen acetylene burners and similar supercharged heaters.

It will be apparent to those skilled in the art that the novel principles of the invention disclosed herein in connection with specific exemplifications thereof will suggest various other modifications and application of the same. It is accordingly desired that in construing the breadth of the appended claims, they shall not be limited to the specific exemplifications of the invention described herein.

Having thus described the invention, what I claim as new and desire to be secured by Letters Patent, is as follows:

1. Apparatus for making the surface of a polyethylene body more receptive to adhesives, inks and the like, including in combination a source of intense heat, means for moving the polyethylene body in the intense heat from said source, and additional means for moving said source of heat independently of movement of the body and in a direction opposite to body motion during heating to expose successive portions of said body to said heat and effect only superficial heating of said portions.

2. The process for making the surface of a polyethylene body more receptive to adhesives, inks and the like, comprising moving a polyethylene body in an area of intense heat from a moving source, moving said source independently of the movement of said body, and wherein the movement of the body relative to said source is greater than the absolute movements of the source and the body individually in an additive sense during heating.

3. The process recited in claim 2, and wherein the movement of the source is cyclic and the relative rate of movement between the body and source, during a part of the cyclic movement of the source, is less than the absolute rate of movement of the source and body individually.

References Cited in the file of this patent
UNITED STATES PATENTS

| | | |
|---|---|---|
| 1,680,681 | Herzog | Aug. 14, 1928 |
| 2,632,921 | Kreidl | Mar. 31, 1953 |
| 2,648,097 | Kritchever | Aug. 11, 1953 |